(12) United States Patent
Artner

(10) Patent No.: US 6,474,709 B2
(45) Date of Patent: Nov. 5, 2002

(54) DEVICE FOR THE ABSORPTION OF IMPACT ENERGY IN MOTOR VEHICLES AND METHOD OF MAKING SAME

(75) Inventor: Bernd Artner, Renningen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/732,905

(22) Filed: Dec. 11, 2000

(65) Prior Publication Data

US 2001/0013706 A1 Aug. 16, 2001

(30) Foreign Application Priority Data

Dec. 10, 1999 (DE) .......................... 199 59 701

(51) Int. Cl.⁷ .............................. B60R 19/34; B60J 7/00
(52) U.S. Cl. ........................ 293/133; 293/70; 296/189; 296/187
(58) Field of Search ................ 293/133, 132, 293/60, 70; 296/188, 189, 187

(56) References Cited

U.S. PATENT DOCUMENTS

| | | | | |
|---|---|---|---|---|
| 3,671,068 A | * | 6/1972 | Gerhard .......................... 293/1 |
| 3,794,342 A | | 2/1974 | Froumajou et al. ... 280/106.5 R |
| 3,860,258 A | * | 1/1975 | Feustel et al. ................. 293/60 |
| 3,887,223 A | * | 6/1975 | Bez .............................. 293/70 |
| 3,955,640 A | * | 5/1976 | Yamanaka .................... 293/69 |
| 3,983,963 A | * | 10/1976 | Nakamura .................... 293/70 |
| 4,190,276 A | * | 2/1980 | Hirano et al. ................ 293/133 |
| 4,272,114 A | * | 6/1981 | Hirano et al. ................ 293/133 |
| 4,465,312 A | * | 8/1984 | Werner ........................ 293/133 |
| 4,702,515 A | * | 10/1987 | Kato et al. ................... 296/189 |
| 5,403,049 A | | 4/1995 | Ebbinghaus ................ 293/133 |
| 5,431,445 A | * | 7/1995 | Wheatley .................... 296/189 |
| 5,680,886 A | * | 10/1997 | Ohtsuka ...................... 296/187 |
| 5,732,801 A | * | 3/1998 | Gertz .......................... 293/133 |
| 5,876,077 A | * | 3/1999 | Miskech et al. ............. 293/132 |
| 5,876,078 A | * | 3/1999 | Miskech et al. ............. 293/133 |
| 6,174,009 B1 | * | 1/2001 | McKeon ...................... 293/133 |
| 6,179,355 B1 | * | 1/2001 | Chou et al. ................. 293/133 |
| 6,250,711 B1 | * | 6/2001 | Takahara ..................... 296/189 |

FOREIGN PATENT DOCUMENTS

| | | |
|---|---|---|
| DE | 2 151 827 | 6/1972 |
| DE | 21 37 517 | 2/1973 |
| DE | 24 27 764 | 1/1976 |
| DE | 26 36 696 | 2/1978 |
| DE | 80 10 342 | 9/1980 |
| DE | 41 34 545 | 11/1992 |
| DE | 42 41 103 | 6/1993 |
| DE | 196 54 559 | 7/1998 |
| DE | 198 03 156 | 8/1999 |
| DE | 198 14 842 | 10/1999 |
| EP | 0 467 340 | 1/1992 |
| EP | 0 949 092 | 10/1999 |
| EP | 1 104 857 | * 9/2000 |
| JP | 8 216917 | * 8/1996 |
| JP | 8-276804 | 10/1996 |

* cited by examiner

*Primary Examiner*—Kiran Patel
(74) *Attorney, Agent, or Firm*—Crowell & Moring LLP

(57) ABSTRACT

A device for the absorption of impact energy in motor vehicles is designed with a box profile section of sheet metal construction fixed in use to at least one bodywork component. In the direction of introduction of a force that is to be absorbed, the box profile section is designed with a tapered extension such that, when compressed by the force to be absorbed, the deformed material accumulates substantially inside the cross-section of the remaining deformation length of the box section profile in a manner at least approximating to a concertina.

8 Claims, 3 Drawing Sheets

DEVICE FOR THE ABSORPTION OF IMPACT ENERGY IN MOTOR VEHICLES AND METHOD OF MAKING SAME

BACKGROUND OF THE INVENTION

This application claims the priority of German application No. 19959701.4, filed Dec. 10, 1999, the disclosure of which is expressly incorporated by reference herein.

The invention relates to a device for the absorption of impact energy in motor vehicles having a box profile section of sheet metal construction fixed to a body frame component. Preferred embodiments provide for the box profile section with a tapered extension in a direction of a force to be absorbed.

As a measure for increasing passive safety and for reducing repair costs in the event of accidents at low vehicle speed, motor vehicles nowadays have bumpers and deformation elements, which are deformed in the event of an impact at low-speeds up to 10 km/h, for example, without this having consequences for the structure of the bodywork (body frame) or damaging other vehicle components, such as the lighting, for example. The amount of energy that can be absorbed is dependent here on the admissible deformation distance and the resistance force of the impact absorption device, it being necessary to select a level of force for the resistance elements that is low enough to prevent compression setting of the vehicle components supporting them in the event of deformation.

German Patent document DE-OS 2 151 827 (corresponding U.S. Pat. No. 3,794,342) discloses so-called crash boxes relevant thereto, which represent a sheet metal box profile section of a substantially cuboidal tapered shape which, when force is introduced in their longitudinal direction, is freely deformed and from a certain degree of deformation onwards forms a solid block. In order to keep repair costs low in the event of a minor accident at low vehicle speed, it is necessary, until the kinetic energy has been completely dissipated, to prevent the said block being displaced against the core structure of the bodywork and damaging the latter. This, however, calls for a sometimes considerable overall length of the crash element.

The overall length necessary moreover makes it difficult to use such crash boxes as side impact protection, with the result that they are mainly to be found in the front end of the vehicle.

In addition, deformation elements are known in the form of various extendable impact elements, which are activated by a system of sensors, which detects an obstacle in good time prior to the collision, so that the said elements extend immediately prior to a collision involving the motor vehicle.

German Patent document DE 196 54 559 discloses one such impact-absorbing device for a motor vehicle with an impact energy-absorbing component, which can be extended in the longitudinal direction of the motor vehicle from a starting position, in which it is accommodated substantially in a vehicle frame side member, into a crash position. In the event of an impending accident the impact energy-absorbing component is automatically driven into its crash position projecting from the vehicle, in which position the full impact energy-absorbing capacity is available. For this purpose the impact energy-absorbing component is designed with a cylinder arranged in the vehicle frame side member and a piston constituting a deformable reduction piece, which can be moved into the crash position by compressed gas. In the event of a collision the impact energy is transmitted from a bumper or impact-absorbing element to the reduction tube, the latter being forced through a reduction ring in the longitudinal direction of the frame side member.

This known solution with a reduction ring is unsatisfactory, however, with regard to its efficiency at higher impact speeds and the high manufacturing cost of the reduction ring. Furthermore this solution has the disadvantage that in the crash position the deformable reduction tube has a tendency to buckle under the action of an oblique force.

In addition to this known solution numerous folding tube energy absorption elements are known, which work on the principle of rolling deflection and permit high energy absorption with a constant force level. The solutions described in German Patent document DE 42 41 103, German Patent document DE 41 34 545 C2 and German Patent document DE 198 03 156 might be cited as examples of these.

Common to all these known solutions, however, is the fact that they are relatively expensive in their design construction and are not capable of satisfactorily withstanding an oblique impact.

Although German Patent document DE 21 37 517 B1, European Patent document EP 0 949 092 A1, German Patent document DE 24 27 764 A1 (corresponding U.S. Pat. No. 3,998,485), German Patent document DE 26 36 696 A1, German Patent document DE 198 14 842 A1 and German Patent document DE 80 10 342 U1 disclose devices for absorbing impact energy, which comprise a tapered sheet metal box profile section and have either folds or steps uniformly distributed over their periphery, which prevent buckling in the event of an oblique impact, it is not possible with the said devices to purposely regulate the buckling behaviour.

In this context, an object of the present invention is to create a device for the absorption of impact energy in motor vehicles having a box profile section, by means of which buckling under the action of an oblique force is largely prevented and in which the buckling behaviour can be purposely regulated.

According to the invention this object is achieved by a device for the absorption of impact energy in motor vehicles having a box profile section of sheet metal construction fixed to a body component, the box profile section being designed with a tapered extension in a direction of introduction of a force that is to be absorbed wherein the box profile section has creases, at least some of said creases being staggered in relation to one another in a peripheral direction of the box profile section.

The device for the absorption of impact energy according to the invention has the advantage that owing to the tapered extension of the box profile section in the direction of introduction of the force that is to be absorbed, the material of the section already deformed can be displaced in concertina fashion under the material of the remaining deformation length of the box profile section, viewed in a cross-sectional direction. In this way, in the event of a vehicle impact, a high energy absorption with a constant force level is obtained, while largely avoiding the formation of a block in the deformation process.

At the same time the tapered box profile section according to the invention represents a low-cost component of simple design, which in addition possesses a relatively high rigidity in response to deflection buckling as a result a force acting obliquely to the longitudinal axis of the box profile section.

With an embodiment of the device for the absorption of impact energy according to the invention, constant absorption of the force can be optimized by predefining the mode of folding by means of creases formed into the box profile section. In this case the arrangement and design of the creases is preferably matched to the free deformation length of the box profile section, the vehicle weight and the force to be absorbed, so that a uniform folding can be achieved without deflection buckling in the event of an oblique impact.

Further advantages and advantageous features or preferred embodiments of the invention are described below and in the claims.

Other objects, advantages and novel features of the present invention will become apparent from the following detailed description of the invention when considered in conjunction with the accompanying drawings.

DETAILED DESCRIPTION OF THE INVENTION

Figure 1:
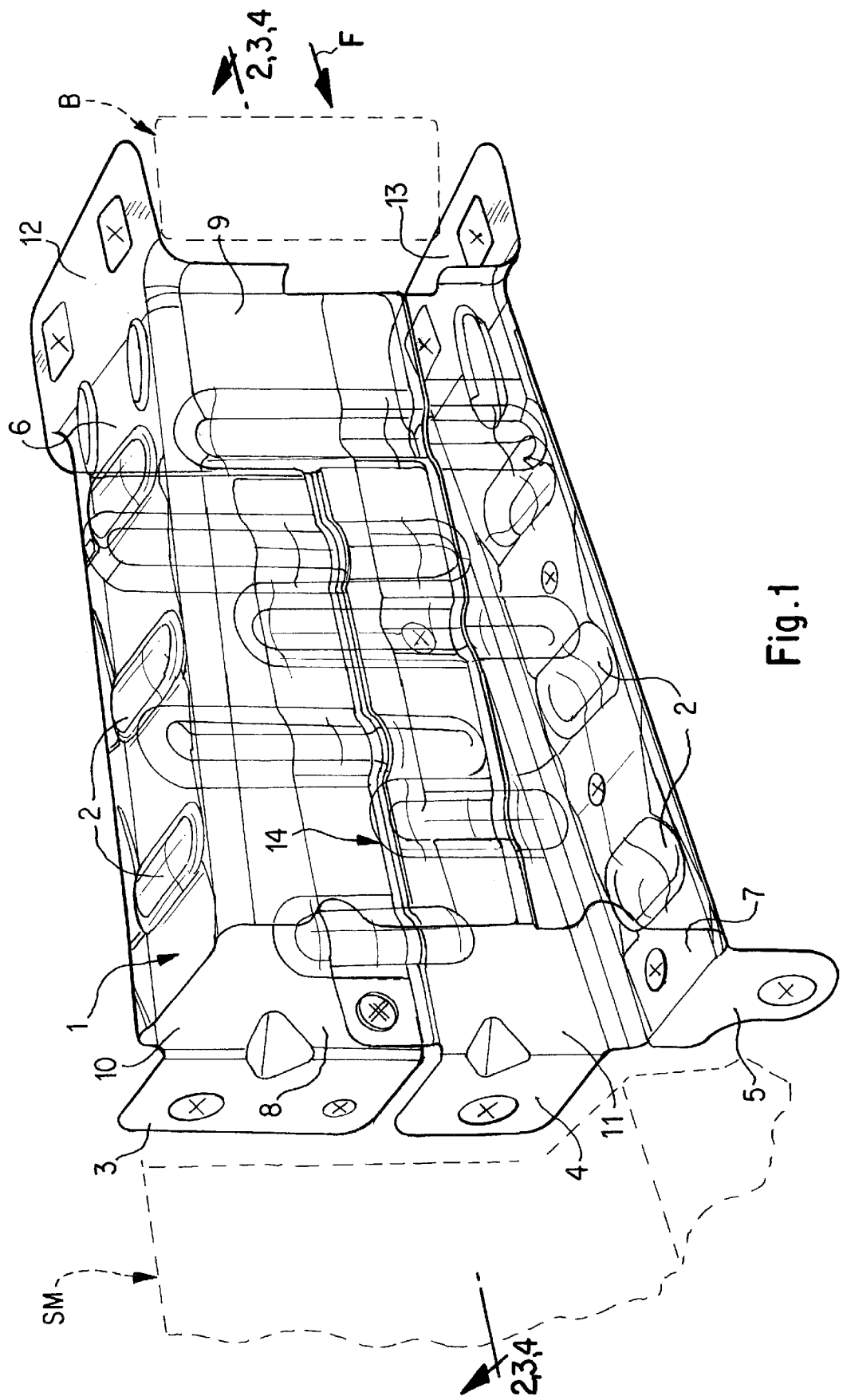
FIG. 1 shows a three-dimensional representation of a device for the absorption of impact energy according to a preferred embodiment of the invention with a box profile section, which is of tapered shape and has creases.

Referring to the see-through diagram in FIG. 1, this represents a box profile section 1, which is provided as a deformation element between a bumper B, not shown further, which may be designed on known principles as a bendable aluminium cross member with plastic cladding, and a vehicle frame side member SM.

Fitting the box profile section 1 according to the invention at this location in the vehicle proves particularly advantageous, since the front area of a vehicle body in particular is most frequently susceptible to different types of impact and repairs to the vehicle frame side members are complex and expensive. It is also contemplated, however, in other designs and with corresponding modification of the box profile section 1, to fit the same at other locations in the vehicle, for example as side impact protection structure.

As can be seen from FIG. 1, the box profile section 1 has a tapered extension to its cross-section in the direction of introduction of a force denoted by an arrow "F". In this the rectangular cross-section of the box profile section is extended in such a way that if force is introduced due to an accident accompanied by deformation of the box section profile 1, the deformed material within the cross-section of the remaining deformation length of the box section profile 1 is accumulated like a concertina. In this way the remaining block length after a maximum deformation of the box profile section 1 is considerably reduced in comparison to a cuboidal design, for example. A cross section of the box profile section conducive to folding may also be polygonal or circular in shape.

In order to optimise the folding behaviour of the material in the event of a deformation, the box profile section 1 of sheet metal construction has creases 2, the arrangement and design of which predetermines the mode of folding in the event of a deformation. The creases 2 are designed taking into account the free deformation length of the box profile section 1 and the weight of the vehicle, so that the deformation begins to occur under a force, which is to be absorbed and which can no longer be absorbed by the bumper in front, and up to the point of block formation is capable of absorbing a maximum force that is introduced into the box profile section 1 in the event of a vehicle impact at low speed, up to a maximum of 15 km/h, for example.

Although the arrangement and design of the creases 2 are dependent upon the type of vehicle and can be adapted to actual circumstances by the person skilled in the art, the creases are preferably designed so that if force is introduced obliquely to the longitudinal axis of the box profile section 1, the box profile section has sufficient rigidity to withstand buckling. This applies in particular to an impact angle that frequently occurs in practice of 5° to 45° degrees to the longitudinal axis of the motor vehicle or the box profile section 1.

In order to stiffen the box profile section 1 towards its tapered extension and its attachment, indicated by the fixing plates 3, 4, and 5, to an interface with the core body and/or a vehicle frame side member SM, the creases 2 in the embodiment shown in FIG. 1 have a smaller depth in the direction of the tapered extension of the box profile section 1 than in the area of the box profile section 1 facing the introduction of force F. Thus, referring to FIG. 2, $d_1$ is longer than $d_2$, and $d_2$ is longer than $d_3$.

Figure 4:
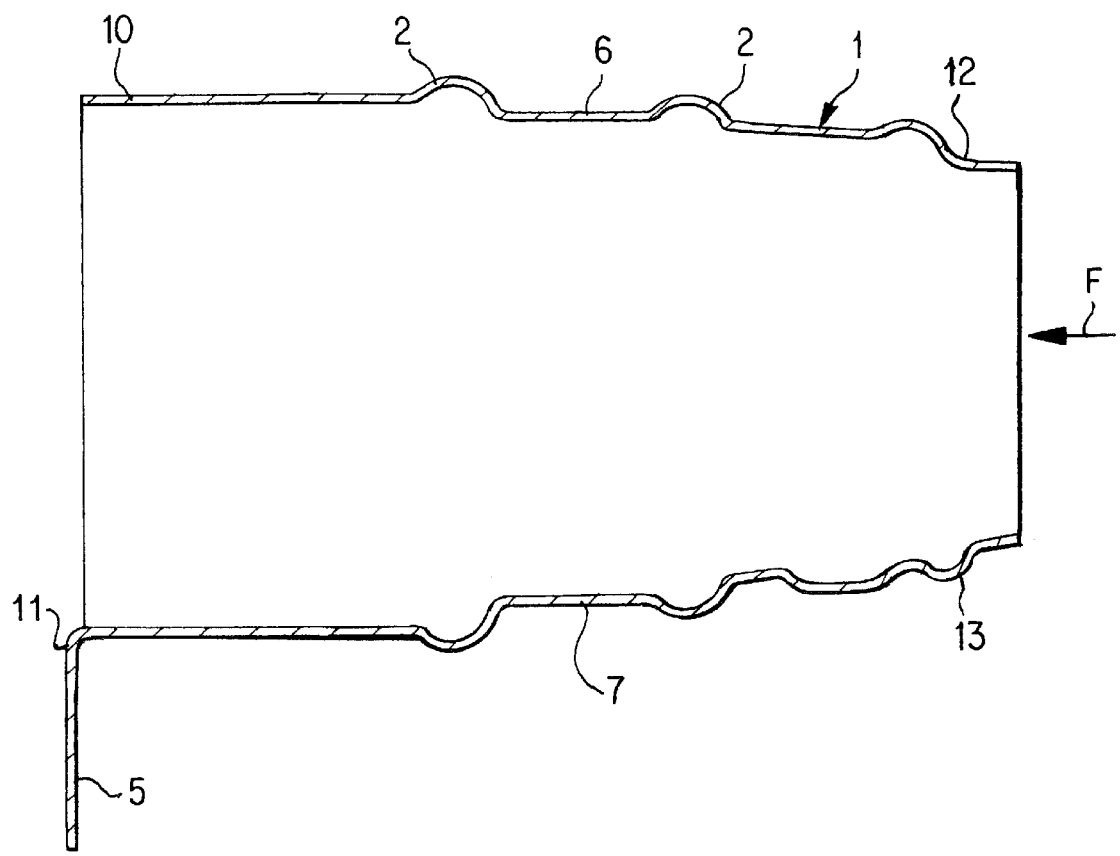
FIG. 4 shows a longitudinal section with creases substantially situated toward the front.

In contrast to this, provision may also be made in a further contemplated embodiment, as shown in FIG. 4, for the formation of creases solely in an area of the box profile section 1 facing the introduction of force F.

In the embodiment shown in FIG. 1 the creases 2 are of relatively broad design, which likewise counteracts any tendency to buckling during deformation. The creases 2 are arranged in a line running symmetrically around the cross section of the box profile section 1 in the peripheral direction of the box profile section 1, thereby resulting in the formation of "harder" areas without creases in the cross section and "softer" areas with a cross section interspersed with creases, which in the event of a crash produce a desired folding pattern. In order to prevent rapid folding in the area of the creases 2, the corner areas between a top side 6, a bottom side 7 and the respective side faces 8, 9 adjoining each of these are in this case designed without creases.

Figure 2:
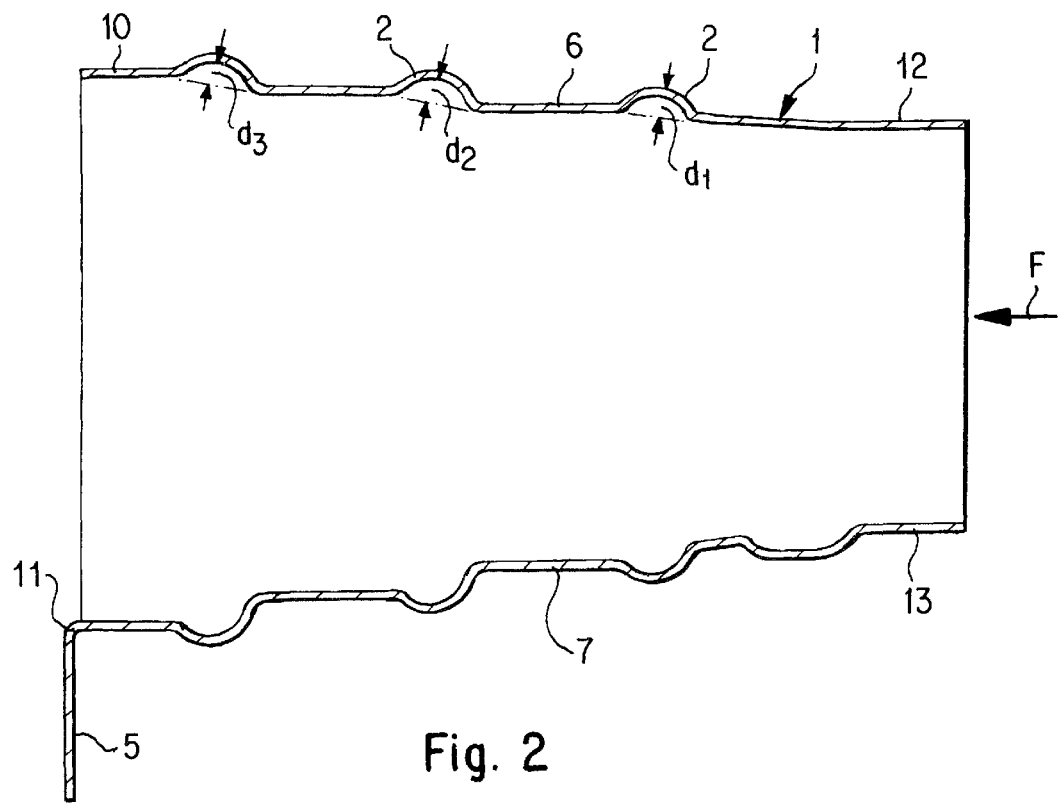
FIG. 2 shows a longitudinal section through the box profile section along the line II—II in FIG. 1.

As can be seen from the simplified longitudinal section through the box profile section 1 shown in FIG. 2, the creases 2 on the top side 6 and the bottom side 7 of the box profile section 1 are arched outwards, while on the side faces 8, 9 they are arched inwards, as can clearly be seen in particular in FIG. 1. With the design according to the embodiments shown, uniform folding can thereby be ideally achieved with a constant force absorption, the deformation distance being relatively large for a short overall length of the box profile section 1.

Figure 3:
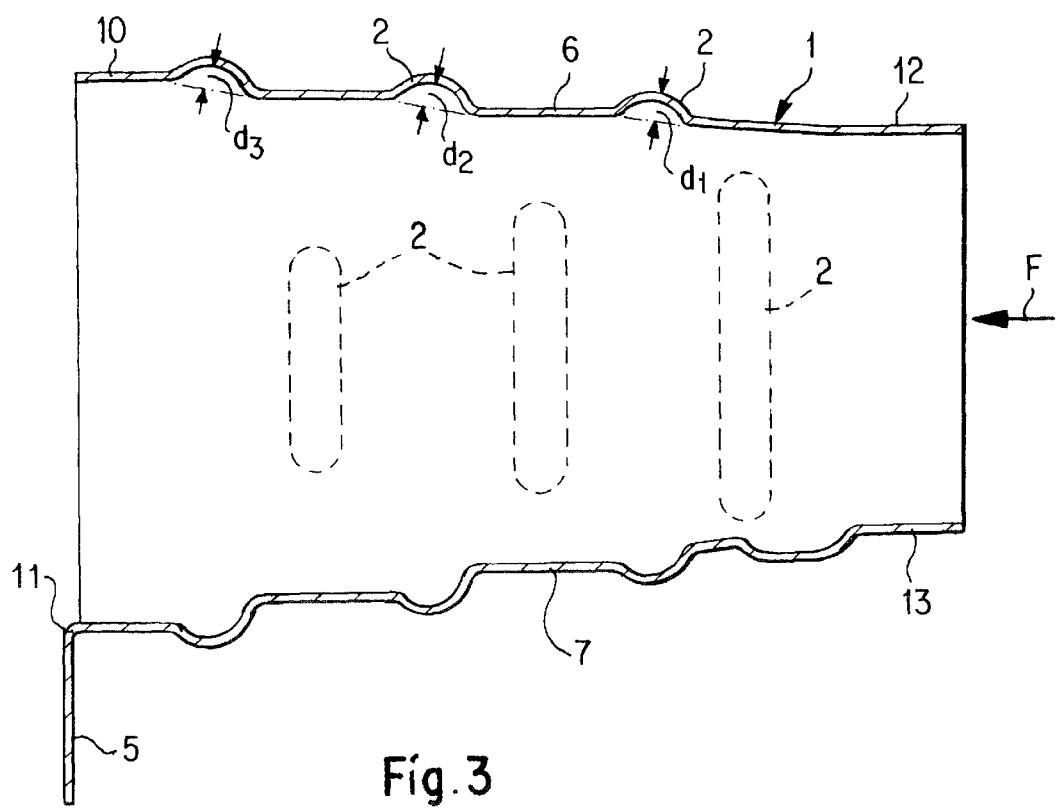
FIG. 3 shows a longitudinal section with staggered creases.

In another design with different set parameters, however, the creases may be at least partially staggered in relation to one another in the peripheral direction of the box profile section 1, resulting in higher, more uniform rigidity, as seen in FIG. 3. Thus, for example the creases may be arranged on the same line opposite sides of the cross-section but offset in relation to the laterally adjoining crease. In the same way, in order to obtain a specific, desired fold pattern, the creases may also all be correspondingly arched inwards or outwards or in other arrangement.

With regard to its manufacture, the box profile section 1 is a low-cost sheet metal profile, which as a shell construction is designed with a first shell 10 and a second shell 11, which both represent pressed sheet metal parts. In the example embodiments shown, the shells or flanges 10, 11 are integrally formed with the fixing plates 3, 4, 5 for bolting the box profile section 1 to a base plate for the interface with the core body or frame side member SM, and in each case integrally formed with a further fixing plate 12, 13 for bolting to a cross member of the bumper B. The fixing plates 12, 13 may also be fixed to the shells or flanges 10, 11 by known fixing methods. The shells 10, 11 are connected to one another by spot welds in certain preferred embodiments, although the connection may also be made by some other method, such as MAG welding, according to other contemplated embodiments.

In the present example of an embodiment as shown in the drawing, the joint line 14 between the first shell 10 and the second shell 11 runs centrally and horizontally through the box profile section 1, but the joint line 14 may also run vertically or at a certain angle to the longitudinal axis of the box profile section 1, according to the desired folding behaviour.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An assembly for the absorption of impact energy in motor vehicles having a box profile section of sheet metal construction fixed in use to a body component, the box profile section being designed with a tapered extension in a direction of introduction of a force (F) that is to be absorbed, wherein the box profile section has creases, at least some of said creases being staggered in relation to one another in a peripheral direction of the box profile section, and wherein the creases in an area toward the introduction of the force (F) have a greater depth than creases in an area of the box profile section remote from the introduction of the force (F).

2. An assembly according to claim 1, wherein the box profile section has an at least approximately rectangular cross-section.

3. An assembly according to claim 1, wherein the box profile section is of shell construction with at least a first shell and a second shell.

4. An assembly according to claim 1, wherein the creases are arranged substantially in a portion of the box profile section situated toward the introduction of the force (F) when in an in use position on a vehicle.

5. The assembly according to claim 1, wherein the creases on a top side and a bottom side of the box profile section are arched outwards and the creases on the side faces of the box profile section are arched inwards.

6. An assembly for the absorption of impact energy in motor vehicles having a box profile section of sheet metal construction fixed in use to a body component, the box profile section being designed with a tapered extension in a direction of introduction of a force (F) that is to be absorbed, wherein the box profile section has creases, at least some of said creases being staggered in relation to one another in a peripheral direction of the box profile section, and wherein the creases on a top side and a bottom side of the box profile section are arched outwards and the creases on the side faces of the box profile section are arched inwards.

7. An assembly according to claim 6, wherein the box profile section has an at least approximately rectangular cross-section.

8. An assembly according to claim 6, wherein the box profile section is of shell construction with at least a first shell and a second shell.

* * * * *